J. A. COWLES.

LANTERN.

No. 7,091. Reissued May 2, 1876.

WITNESSES:

Julius Wilcke

N. H. Sherburne,

INVENTOR:

James A. Cowles

By Gidley & Sherburne

Attys

N. PETERS, PHOTO-LITHOGRAPHER, WASHINGTON, D. C.

UNITED STATES PATENT OFFICE.

JAMES A. COWLES, OF CHICAGO, ILLINOIS, ASSIGNOR OF ONE-HALF INTEREST TO HERMAN B. GOODRICH, OF SAME PLACE.

IMPROVEMENT IN LANTERNS.

Specification forming part of Letters Patent No. 42,928, dated May 31, 1864; reissue No. 7,091, dated May 2, 1876; application filed April 6, 1876.

*To all whom it may concern:*

Be it known that I, JAMES A. COWLES, of Chicago, in the county of Cook and State of Illinois, have invented certain new and useful Improvements in Lanterns; and I do hereby declare the following to be a full, clear, and exact description thereof, which will enable others skilled in the art to which my invention appertains to make and use the same, reference being had to the accompanying drawing, forming part of this specification, in which—

Figure 1:
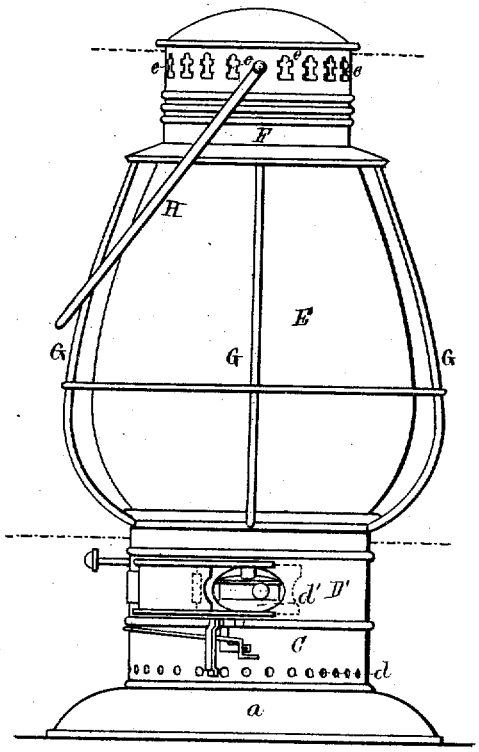
Figure 2:
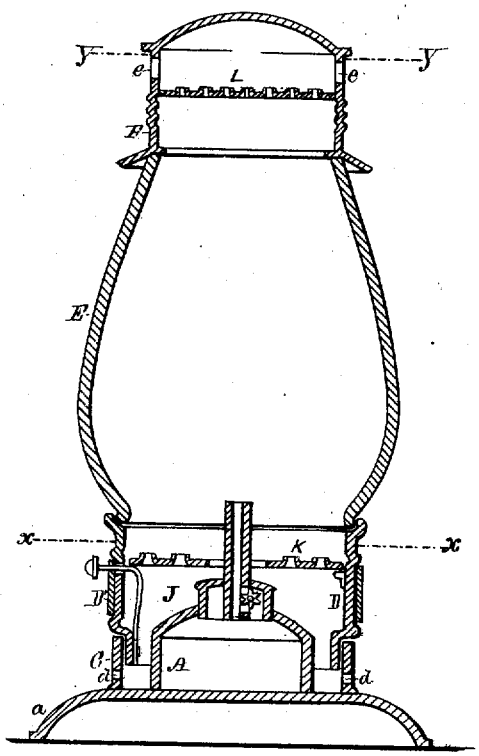
Figure 3:
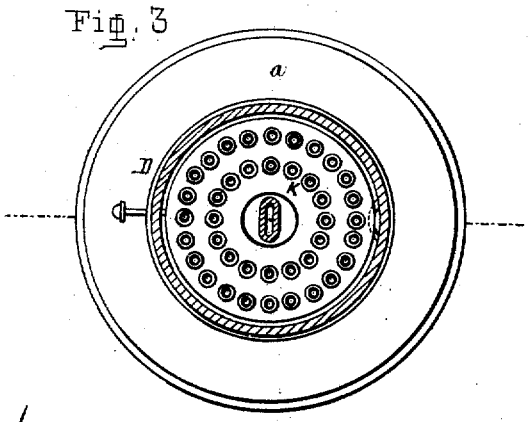
Figure 4:
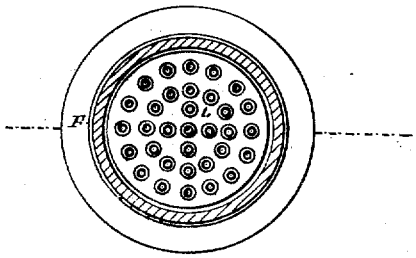

Figure 1 represents a side elevation of a lantern embodying my invention. Fig. 2 represents a vertical central section thereof. Figs. 3 and 4 represent sectional plans of the same, Fig. 3 being taken on line *x x*, and Fig. 4 on line *y y*, drawn across Fig. 2.

Like letters of reference indicate like parts.

My invention relates to that class of lanterns employing a cylindrical glass globe, through which the light from the flame radiates; and the object of my invention is to so construct and arrange the several parts of a lantern relative to each other as to prevent the admission of a descending current of air within the globe, and to supply the flame with a steady and uniform current of oxygen, by means of an ascending volume of air through the globe, whereby a more perfect combustion is produced, as will more fully appear from the following description.

In the drawing, A represents the oil-pot, to which is attached a convex annular flange, *a*, forming the base of the lantern, in the usual manner. C is an annular rim, permanently secured to the base *a* around the oil-pot, as shown in Fig. 1. D is a like annular rim, secured to the upper edge of rim C, and so arranged as to admit of being removed therefrom at will. E is the globe, which is secured at its lower end to the upper edge of rim D. F is a sheet-metal hood, secured at its lower edge to the upper end of the globe. G G are the guards, each of which is attached at its upper end to the hood, and at its lower end to the rim D. H is the bail, which is hinged to the hood, and forms the handle by which the lantern is carried.

The arrangement of the rims C and D is such as to form an air-chamber, J, around the oil-pot and wick-tube, and each of said rims C and D is provided with a series of openings, *d d′*, through which the air can freely pass into the chamber. The openings *d′* of rim D are of sufficient size to admit of the thumb and finger being inserted, so as to adjust the wick-ratchet *c*, for elevating or depressing the wick. Mounted upon and around rim D is a sleeve, D′, so arranged as to freely revolve thereon, and is provided with a series of openings corresponding with the openings in the rim, which are so arranged relative to each other that when the sleeve is in its normal position its openings and those in the rim are in one and the same plane; yet, by a slight rotary movement of the sleeve, its wall is moved over the openings in the rim, and thereby closing, or partially closing, said openings, as may be desired. K is a perforated diaphragm, arranged within rim D immediately under the lower opening of the globe, and above the openings *d* and *d′*. The area of the perforations in the diaphragm K is such as to admit of the passage of a current of air through them into the globe sufficient to supply the flame with the necessary oxygen, and at the same time prevent any excess of air, which would have a tendency to flare or extinguish the flame from entering the globe.

L is a perforated diaphragm, arranged within the hood immediately over, and a short distance above, the upper end of the globe, and below the openings *e*, formed through the walls of the hood under the cover. The area of the perforations in the diaphragm L is such as to freely admit of passage through them of the volume of heated air ascending through the globe, and which passes off through the side openings *e*, and by means of the cover forming the top of the hood any current of air produced by a sudden gust of, or increase in the velocity of, the wind, which would overbalance the ascending current from the flame, is prevented from passing into the globe.

It is necessary to a complete combustion in a lantern that there should be a steady and uniform current of air passing upward through the globe to supply the flame with oxygen;

and it is equally necessary to prevent a descending current from passing through the globe, which would tend to counteract the ascending current, and thereby cause the flame to flare or extinguish the flame.

The said desired results are accomplished in my said improved lantern in the following manner: The volume of air necessary passes into the lantern through the side openings in the rims C D, and upward through the diaphragm, the latter retarding the velocity of the air, and causing it to pass evenly through the perforations over the entire area of the globe, thereby preventing any undue effect from a sudden gust of wind or increased velocity of the air, and the cover of the hood prevents a descending current of air from entering the globe of sufficient force to counteract the ascending current, and prevent it from passing off through the side openings under the cover.

It will be readily seen that with the perforated diaphragm located under the globe of a lantern, all material which would ignite by contact with the flame is prevented from entering the globe, and thereby renders the lantern perfectly safe in use.

Having thus described my invention, what I claim as new, and desire to secure by Letters Patent, is—

1. In a lantern provided with a hood to prevent a descending current of air from entering the globe, the perforated diaphragm K, arranged between the globe and the oil-pot, substantially as and for the purpose specified.

2. The combination, with the hood F of a lantern, of the perforated diaphragm L, globe E, and perforated diaphragm K, substantially as specified.

3. The combination, with the perforated diaphragm K, of the perforated rims D and C, as and for the purpose specified.

4. In a lantern, the combination of the perforated diaphragm K, globe E, and hood F, substantially as and for the purpose specified.

5. In a lantern, the combination, with the oil-pot, of the perforated diaphragm K and globe E, as and for the purpose specified.

6. In combination with the perforated diaphragm K and globe E, the rim C, provided with the opening $d'$, to admit of adjusting the wick, substantially as specified.

7. In a lantern, the combination of the perforated diaphragm K, globe E, hood F, and bail H, substantially as and for the purpose specified.

JAMES A. COWLES.

Witnesses:
N. C. GRIDLEY,
N. H. SHERBURNE.